April 22, 1930.  W. S. SAMPLE  1,755,459
REVERSE MOVEMENT BRAKE MECHANISM FOR AUTOMOBILES
Filed Nov. 13, 1926  2 Sheets-Sheet 1

INVENTOR.
WILBUR S. SAMPLE
BY A. B. Bowman
ATTORNEY

April 22, 1930. W. S. SAMPLE 1,755,459
REVERSE MOVEMENT BRAKE MECHANISM FOR AUTOMOBILES
Filed Nov. 13, 1926 2 Sheets-Sheet 2

INVENTOR.
WILBUR S. SAMPLE
BY A. B. Bowman
ATTORNEY

UNITED STATES PATENT OFFICE

WILBUR S. SAMPLE, OF LOS ANGELES, CALIFORNIA, ASSIGNOR OF ONE-HALF TO EUGENE F. HUNTER, OF LOS ANGELES, CALIFORNIA

REVERSE-MOVEMENT BRAKE MECHANISM FOR AUTOMOBILES

Application filed November 13, 1926. Serial No. 148,267.

This invention relates generally to reverse movement control mechanisms, and more particularly to automobile emergency brakes for preventing backward movement of an automobile.

The invention is particularly useful for braking an automobile against backward travel when the engine of the automobile is accidentally "killed", when the operator intentionally stops the engine, when the operator releases the clutch to shift gears, when the automobile is parked on a hill with the rear end of the automobile lowermost, and whenever the driver finds it necessary to stop the car momentarily while going up a hill.

The principal objects of the invention are: first, to provide an automobile brake and control mechanism which will serve particularly as an emergency brake and which may be readily, quickly and conveniently applied to effectively prevent backward travel of the automobile on which it is applied; second, to provide an emergency brake mechanism of this class which may be readily applied to or in connection with the propeller shaft, or main driven shaft, of an automobile; third, to provide a mechanism of this class in which the emergency reverse brake is applied by only a small movement of and slight pressure on the control lever or other means of the mechanism; fourth, to provide novel, normally stationary means for effecting the brake application by engagement with the propeller, or driven shaft, or other means on the shaft; and, fifth, to provide an emergency brake of the character stated which will be simple and economical of construction, practical, durable and highly efficient in operation.

Figure 1:
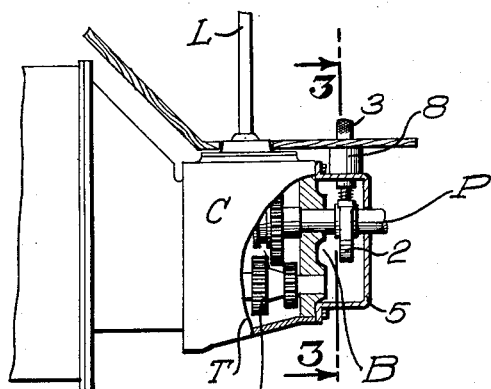
Figure 2:
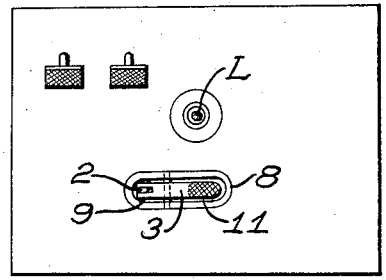
Figure 3:
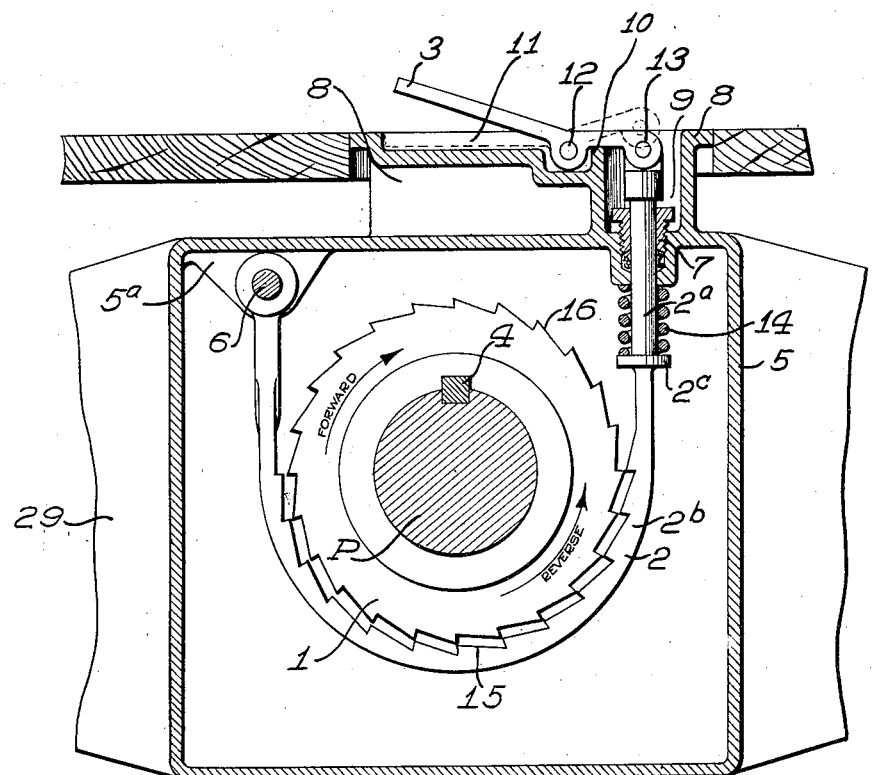
Figure 4:
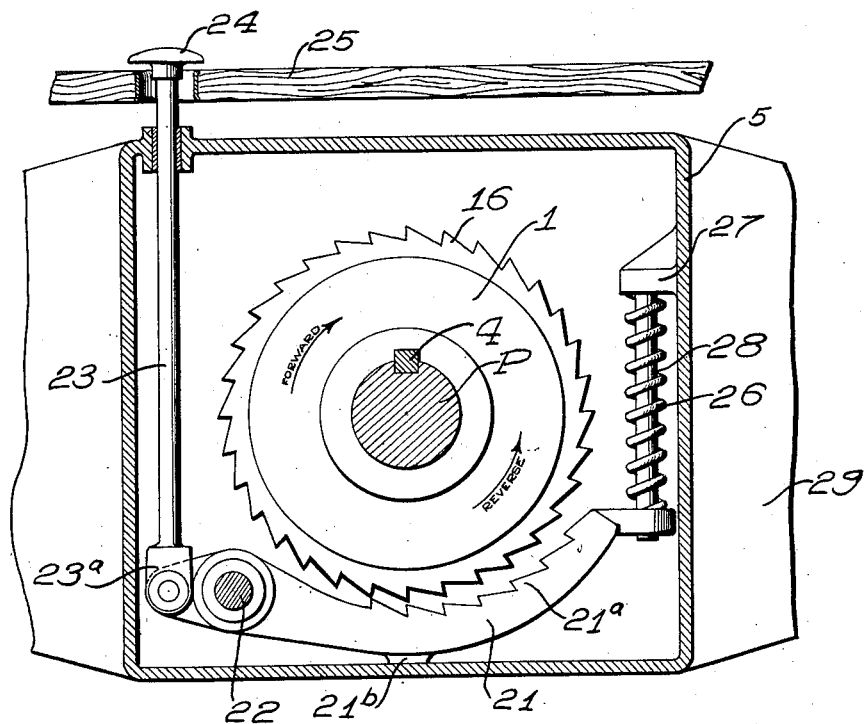

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a fragmentary side elevational view of the normally rear end of an engine of an automobile and a conventional power transmission mechanism in association therewith, and shown located in the conventional position of the present automobile, and with my emergency reverse brake mechanism mounted in connection with the driven shaft and the transmission mechanism and extending above the floor board of the driver's compartment of the automobile; Fig. 2 is a plan view of the driver's compartment of the automobile, showing the relation of the control lever or means of my mechanism with the gear shift lever and conventional pedals of the automobile control mechanism; Fig. 3 is an enlarged transverse sectional view of my emergency brake mechanism taken through 3—3 of Fig. 1; and, Fig. 4 is a view similar to that shown in Fig. 3 of a slightly modified form of construction of my emergency reverse brake mechanism.

Like characters of reference refer to similar parts and portions throughout the several views of the drawings.

In the drawings, I have illustrated my brake mechanism, generally designated B, as applied to the automobile gear shift transmission, designated T, said transmission including the usual gears G, operating lever L, and the propeller or driven shaft P.

My brake mechanism, in its one form of construction, includes generally, a ratchet wheel 1, a flexible ratchet brake band 2, and a brake operating pedal 3. The ratchet wheel 1 is keyed on the transmission propeller shaft P at the rear portion of the transmission gear casing, designated by C, or at the rear end or outside of said casing, by means of a key 4. A housing 5 is secured to the rear end of said gear casing for enclosing the ratchet wheel 1 and the brake 2. It will be here noted, however, that the housing 5 may form an integral part of the casing C, if desired. One end of the band 2 is pivotally connected at its one end, by means of a pin 6, to lugs 5ª at the inside and on the upper wall of the housing 5. The brake band 2 is preferably a particularly yieldable and resilient metallic band and extends around the lower side of the ratchet 1. The other end of the brake band 2 is preferably rounded and extends through a stuffingbox 7 in the upper wall of the brake housing 5 and upwardly through a recess 9 connecting the stuffingbox portion with the plate portion 8, forming preferably an integral part of the casing 5 and made flush with the floor board of the front compartment of the automobile.

In the upper side of the plate portion 8, is provided a recess 11 for receiving the operating pedal 3, the one portion thereof, when the brake mechanism is in inoperative position, and the other, or lever portion thereof, when the brake mechanism is actuated. The pedal 3 is pivotally mounted intermediate its ends, and preferably nearer to one end than to the other, on a pin 12 which is mounted on and intermediate the ends of the plate portion 8 and extends through the opposite side walls thereof forming the recess therein. The one, and preferably short, end of the lever 3 is pivotally connected, by means of a pin 13, with the end of the band 2 extending above the main portion of the housing. The portion of the lever 3 positioned within the recess, as stated, is preferably flush with the upper side of the plate portion, as shown in Fig. 3.

Between the band portion of the member 2 and the round portion $2^a$, is provided a shoulder $2^c$ between which and the stuffingbox 7 and around the round portion $2^a$ of the member 2 is positioned a compression spring 14 for normally holding the band portion $2^b$ of the member 2 free from the ratchet. The band portion $2^b$ of the brake band member is provided with ratchet teeth 15 at its inner side and only a portion of the distance between its ends. Said teeth 15 are adapted to engage corresponding teeth 16 around the ratchet wheel 1 when the band 2 is contracted upon depression of the pedal 3 by the foot of the operator of the automobile in applying the brake. The engagement of the brake band teeth 15 with the teeth 16 of the ratchet wheel prevents backward rotation of the transmission propeller shaft, or the driven shaft of the automobile, to prevent backing of the automobile for the reasons stated; but the band is sufficiently flexible and the teeth are so shaped as to permit the teeth of the band and the ratchet wheel to escape or pass each other to readily permit forward rotation of the propeller shaft. Within the recess 11 is an abutment 10 which limits the downward position of the short arm of the pedal 3 when the same is permitted to be drawn downwardly by the action of the spring 14.

In the modified form of construction of my emergency reverse brake mechanism, as illustrated in Fig. 4 of the drawings, I have employed a notched shoe or pawl 21 in the form of a lever which is pivotally mounted near one end, by means of a pin 22, within the housing 5. The side of the lever 21 adjacent the ratchet wheel 1 is arcuate and conforms with the periphery of the ratchet wheel 1, and is provided at said side with teeth $21^a$ adapted to engage the teeth of the ratchet wheel and hold the same and, therefore, the wheel and shaft against rotation in a reverse direction, as indicated by the arrow. The end of the lever or pawl 21 near the pivotal axis of the lever, is pivotally connected with the lower bifurcated end $23^a$ of a brake actuating rod 23 which is reciprocally mounted in a vertical direction at one side of and within the housing 5 and extends with its upper end through the upper wall thereof and above the floor board 25 of the automobile. At the upper end of the rod 23 is provided a head or button 24 to facilitate the depression of the rod 23, which requires only slight movement to shift the teeth of the lever 21 into engagement with the teeth of the ratchet wheel.

Within the housing 5 and on the wall thereof opposite the actuating rod 23, is provided a lug 27 between which and the free end of the lever 21 is positioned a compression spring 26 for normally disengaging the teeth of the lever 21 and the ratchet wheel 1 and forcing the stop portion $21^b$ of said lever against the bottom wall of the housing. In the lug 27 may be secured a spring guide rod 28 which may extend through the bifurcated end of the lever 21, as shown. The spring 26 is positioned around the guide rod 28.

It will be here noted that in both instances of the structures of the brake mechanism illustrated, the force of the reversing ratchet wheel is imparted to the shiftable brake member in direct line with the pivotal mountings of the latter, in the first case to the pin 6, and in the second case to the pin 22. Thus the strain on the shiftable brake member is direct tension only. It will be also noted that the force exerted on the pins 6 and 22 is imparted to the housing 5 and in turn, by means of ribs or arms 29, to the frame of the automobile to which the ribs or arms 29 are secured at their ends.

Though I have shown and described a particular construction, combination and arrangement of parts and portions and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In combination with an automobile, an emergency brake including ratchet and flexible ratchet band means for braking the automobile against backward movement, but permitting forward movement of the automobile, 2. In combination with an automobile transmission, an emergency brake including ratchet and flexible ratchet band means for braking the propeller shaft of said transmission to prevent backward movement thereof, but to permit forward movement thereof.

3. In combination with an automobile, an emergency brake including a ratchet wheel secured on a rotating drive member of the automobile, a brake band formed with ratchet teeth on the inside thereof for engaging the teeth of said ratchet wheel when the band is contracted, and means for contracting said brake band.

4. In combination with an automobile, an emergency brake including a ratchet wheel secured on a rotating drive member of the automobile, a brake band formed with ratchet teeth on the inside thereof for engaging the teeth of said ratchet wheel when the band is contracted, means for contracting said brake band, and spring means in connection with said brake band for normally separating the teeth thereof from the teeth of said ratchet wheel.

5. In combination with the propeller shaft of an automobile, a ratchet wheel on said propeller shaft, a brake band partially surrounding said ratchet wheel and formd with ratchet teeth for engaging the teeth of said ratchet wheel when said band is contracted, and means for contracting said band.

6. In combination with the propeller shaft of an automobile, a ratchet wheel on said propeller shaft, a brake band partially surrounding said ratchet wheel and formed with ratchet teeth for engaging the teeth of said ratchet wheel when said band is contracted, and a pedal connected to said brake band for contracting said band around said ratchet wheel.

7. In combination with an automobile, an emergency brake including a ratchet wheel secured on a rotating drive member of the automobile, a brake band formed with ratchet teeth on the inside thereof for engaging the teeth of said ratchet wheel when the band is contracted, means for contracting said brake band, and a housing enclosing said ratchet wheel and brake band and secured to the rear end of the transmission case of said automobile.

8. In an emergency reverse-movement brake mechanism, the combination with an automobile, of a ratchet member secured on a rotating drive member of the automobile, a housing enclosing said drive member and supported directly on the frame of the automobile, a brake member pivotally mounted near one end in said housing and provided with ratchet teeth adapted to engage the teeth of said ratchet member to prevent reverse movement of the latter at the election of the driver of the automobile, and means for actuating said brake member and for shifting the same into engagement with the ratchet member.

In testimony whereof, I have hereunto set my hand at Los Angeles, California, this 2nd day of November, 1926.

WILBUR S. SAMPLE.